April 7, 1936.                    M. S. CURTIS                    2,036,260
                            METALWORKING MACHINE
                             Filed Aug. 26, 1930                4 Sheets-Sheet 2
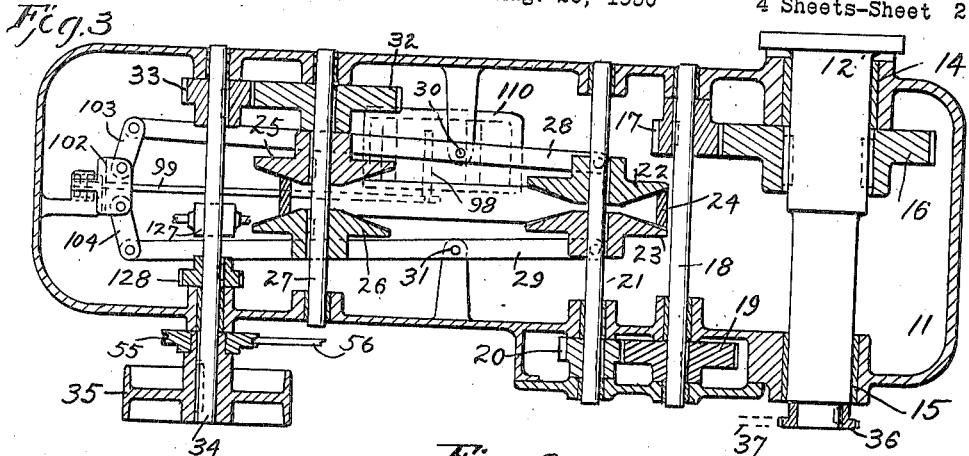
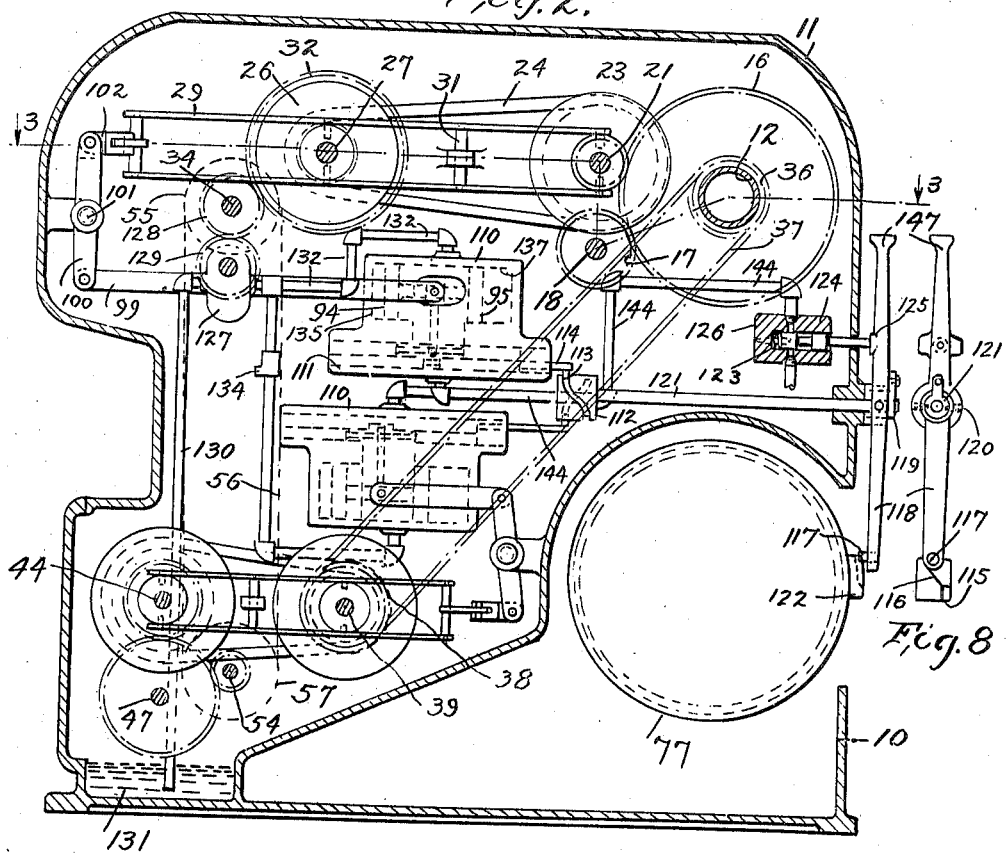
INVENTOR
Myron S. Curtis,
BY
Chas. J. Williamson
ATTORNEY

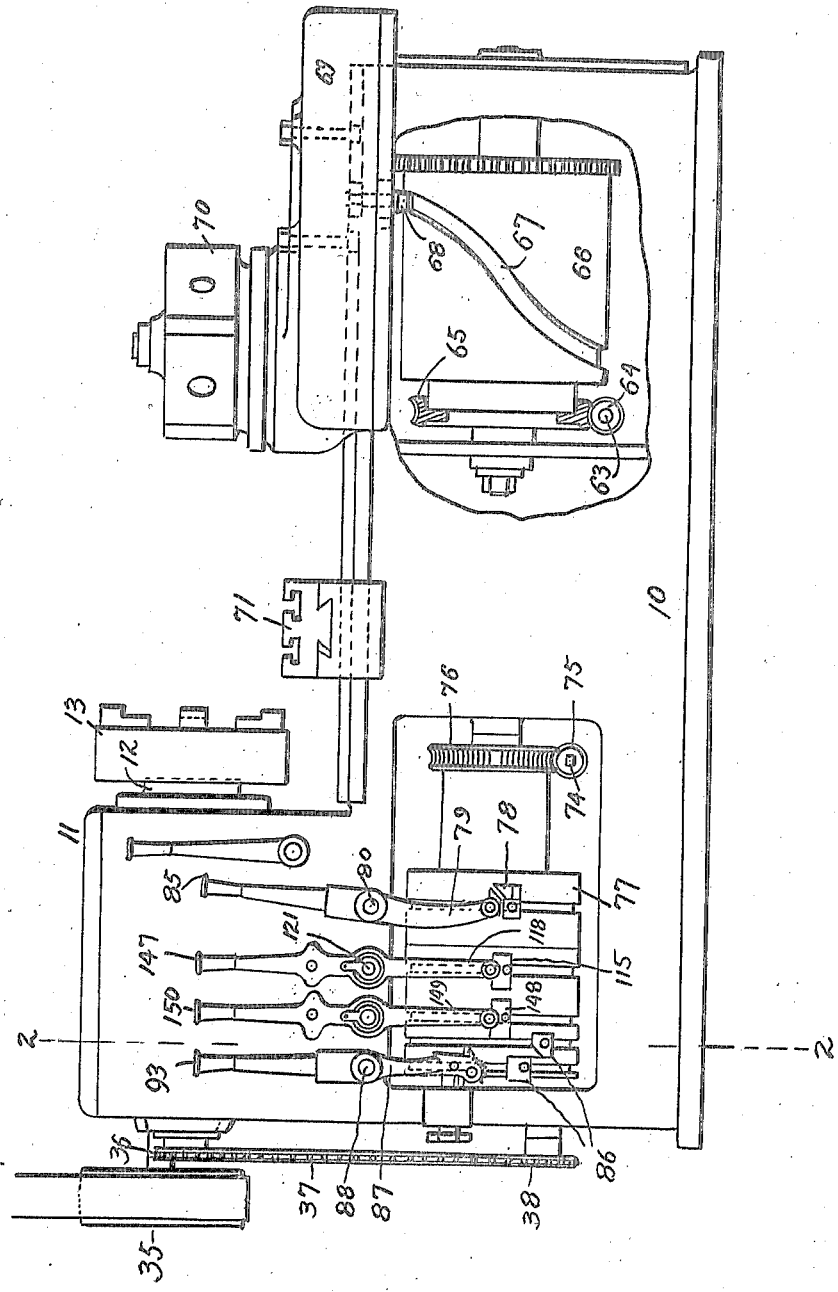

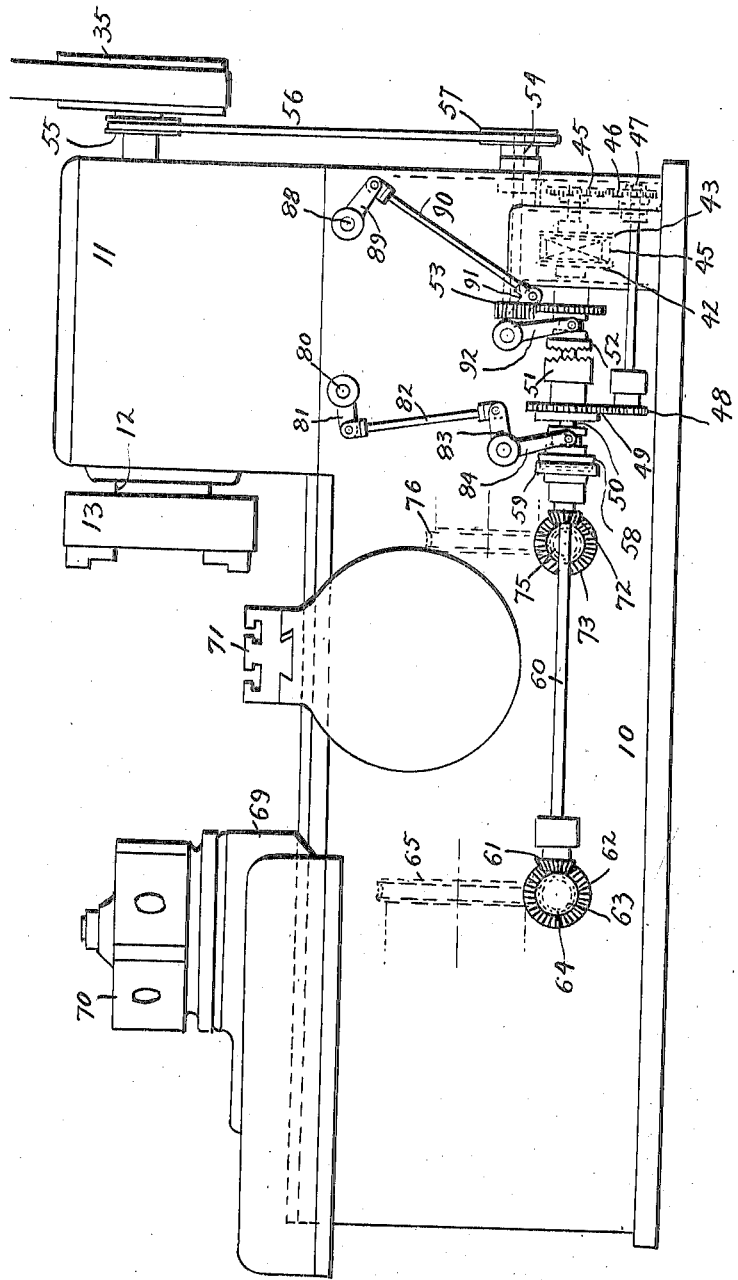

April 7, 1936.   M. S. CURTIS   2,036,260
METALWORKING MACHINE
Filed Aug. 26, 1930    4 Sheets-Sheet 4
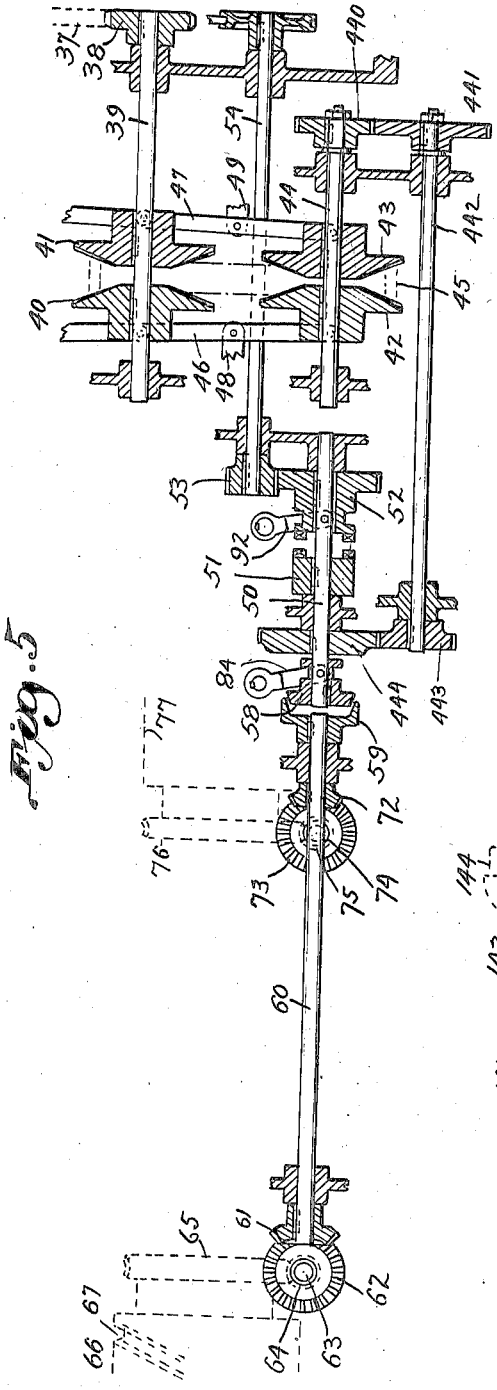
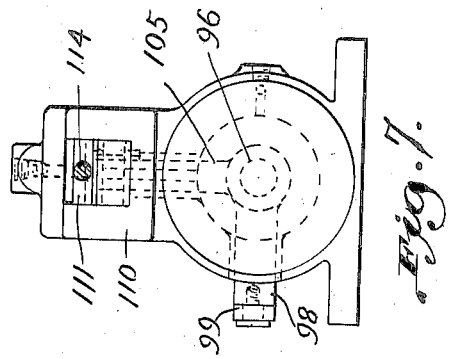
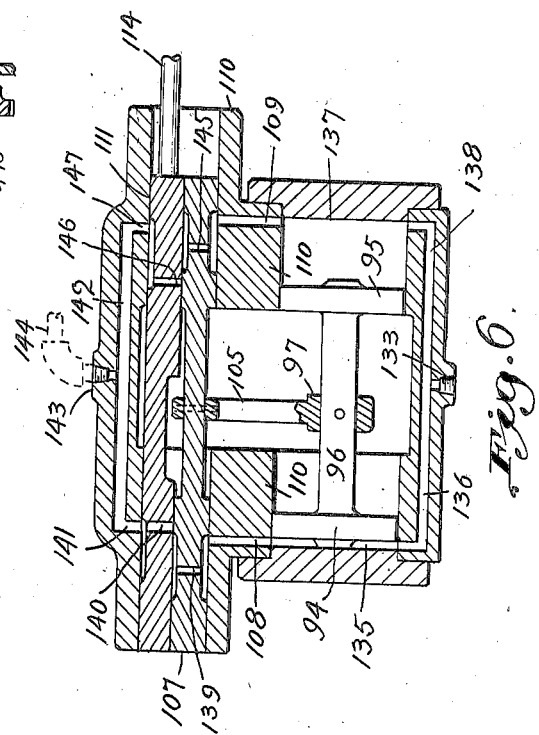
INVENTOR
Myron S. Curtis
BY
Chas. J. Williamson
ATTORNEY Patented Apr. 7, 1936

2,036,260

UNITED STATES PATENT OFFICE 2,036,260

METALWORKING MACHINE

Myron S. Curtis, Pawtucket, R. I., assignor to William Wallace Potter, Pawtucket, R. I.

Application August 26, 1930, Serial No. 477,882

8 Claims. (Cl. 29—44)

My invention comprises gearing for metal working machines which have an element for holding work and a second element for holding tools to operate on the work, one of these elements being rotatable, and the elements being capable of being moved towards and from each other for the purpose of presenting the tools to the work, and removing them from the work.

As one embodiment of my invention, I have selected a turret lathe, which the work-holding element (a spindle) revolves, and the tool-carrying element (a slide) is moved towards and from the work-carrying element. It is, however, understood that I do not limit myself to this particular embodiment nor to an embodiment in which the tool holder moves, and the work-holder revolves, for the work-holding element might be stationary, and the tool-holding element rotatable; the work-holding element might be movable towards and from the tool-holding element; or, they might both be movable; or, there might be any combination thereof.

In the turret lathe selected, it is desirable that the work-holding element, or spindle, be revolvable at different speeds automatically selected and that entirely different sets of automatic speed changes may be secured, as by means of hand change gears; that the feed of the tool holding element or tool slide be maintained in permanent ratio with the spindle while the tools are in a position to do work; that the tool slide have both automatic and hand changes of speed, and that it have for its idle, or non-working movements a constant speed, fast motion entirely independent of and unaffected by the speed of the work holding element or spindle; and that there be a single constant speed driving element from which spindle and tool slide movements are derived.

It is also desirable that the power connection between the constant speed driving-element and the spindle and between spindle and tool slide be changes capable of extremely small or gradual compared with stepped changes, to cover the whole range of speeds of the machine, and yet be positive (in contradistinction to frictional) and be automatically controlled. For this purpose I provide a speed change unit capable of gradual or progressive variation of speeds contrasted with stepped changes as in ordinary gear trains, which includes driving and driven pulleys and a belt between them, which have a toothed connection, but I do not limit myself to this particular type of speed change unit. An important feature of my invention is my means for accomplishing the described variations in the speed.

My invention consists in whatever is described by or is included within the terms or scope of the appended claims.

Referring to the drawings:—

Fig. 1 is a front elevation of the automatic turret lathe, selected to illustrate an embodiment of my invention;

Fig. 2 is a vertical cross section substantially on the line 2—2, of Fig. 1;

Fig. 3 is a cross section through substantially the line 3—3 of Fig. 2 with the shaft that gears the speed change unit and the spindle shown displaced for clarity of illustration;

Fig. 4 is a rear elevation;

Fig. 5 is a cross section through the feed gearing of the machine with the shafts shown out of their actual position in the machine, for clarity of illustration;

Fig. 6 is a cross section through one of the control units;

Fig. 7 is an end elevation of Fig. 6;

Fig. 8 is a side view of the lever actuated by the dog drum, that controls the operation of the speed change unit.

The machine shown in the drawings has a base, 10, which at the top has a housing 11, for the spindle 12, provided as usual with the work-holding chuck, 13. The spindle rotates in bearings 14 and 15 in the housing 11, and keyed to it near one end is a gear, 16, with which pinion 17 keyed to shaft 18 meshes. Removably keyed to the other end of shaft 18 is change gear 19 which meshes with change gear 20 also removably keyed to shaft 21. On shaft 21 are keyed opposing gear cones 22 and 23 that are slidable towards and from one another which by a gear-faced chain 24, is positively geared to and positively driven from gear cones 25 and 26. Gear cones 25 and 26 are slidably keyed to shaft 27. These gear cones of each of the two pairs 23 may be moved toward and from each other by means of arms, 28, and 29, pivoted on studs 30 and 31, respectively, by means hereinafter described and these gear cones, together with the connecting chain and the operating arms, constitute the essential features of the positive speed change unit I prefer to use. As the arms 28 and 29 are pivoted between their cone-engaging ends, it will be seen, as gear cones 25 and 26 are forced together, gear cones 22 and 23 will, at the same time, be forced apart, and vice versa, and the chain 26 will change its radial position respectively to the two sets of cones and therefore change the speed ratio between shafts 27 and 21, and this change may be made by gradual or progressive graduation and thus the nicest and widest variation in spindle speed may be obtained.

Shaft 27 has keyed to it, gear 32 which meshes with gear 33, keyed to constant speed shaft 34, which is driven from some outside source by pulley 35. Through gear connections described with shaft 34, spindle 13 is driven from constant speed shaft 34 with an automatic gradual compared with stepped variation of speeds through the positive speed change unit and a hand variation of speeds through the change gears 19 and 20.

Power to drive the tool slide feed shaft for working feed of the tools is taken from spindle, 13. For this purpose keyed to spindle 13 is sprocket, 36 that by chain 37, drives sprocket 38, keyed to shaft 39. Slidably keyed to shaft 39 are gear cones 40 and 41, of another positive speed change unit which drive cones 42 and 43 slidably keyed to shaft 44 through gear chain 45, the four cones being controlled in position, by levers 46 and 47 pivoted on studs 48 and 49 respectively. Removably keyed to shaft 44, is change gear 440 which meshes with change gear 441 removably keyed to jackshaft 442, to the other end of which is keyed gear 443 meshing with ratchet gear 444 on feed shaft 50, which shaft transmits motion to the cam drum for reciprocating the tool slide. Ratchet gear 444 may drive shaft 50, or shaft 50 may run away from gear 444 when driven at a higher speed through clutch 51, keyed to shaft 50, clutch gear 52 freely revolving on shaft 50 and driven by pinion 53 keyed to shaft 54. Shaft 54 is driven at a high constant speed from pulley shaft 34 through pulley, 55, belt 56 and pulley 57. Therefore, when clutch gear 52 is connected with clutch 51, feed shaft 50 is driven at a high speed and runs away from ratchet gear 444, and when clutch gear 52 is disconnected from clutch 51, shaft 50 is picked up and revolved by ratchet gear 444 in a well known manner. Thus feed shaft 50 may be driven from the spindle at a slow speed for work, which, though automatically variable is in fixed ratio to the spindle speed, or it may be driven at a high, constant speed driven from constant speed shaft 34, for the return and other idle motions of the tool slide.

Slidably keyed to shaft 50, is friction clutch head 58, which can be clutched or declutched with friction cone 59, keyed to shaft 60, and thus, shaft 60 can either be driven by feed shaft at its various speeds, or it may be entirely disconnected.

Shaft 60, through bevel gears 61 and 62, drives worm shaft 63, to which is keyed worm 64 which by means of worm gear 65 revolves cam drum 66. The drum by means of cam path 67 and cam roll 68, fast to turret slide 69, moves the latter toward and from the chuck, 13. Turret slide 69 is slidably mounted on base 10 and carries turret 70 to which tools may be fastened and which may be indexed as usual, by means which do not form part of this invention.

Various other tool carrying slides such as a cross slide 71 may be mounted on the base 10 and driven from feed shaft 50 by suitable gear connections not necessary to describe.

Feed shaft 60, also, by means of bevel gears 72 and 73, worm shaft 74, worm 75 and worm gear 76, drives dog drum 77 at such a speed that there is one revolution of dog drum 77 for each complete cycle of the machine; and the various automatic operations of the machine are controlled by dogs on drum 77. The front end of shaft 74 may be squared to receive a crank handle and thus the various slides may be operated by hand when clutch 58 is disconnected from cone 59.

The operation of clutch 58 is automatically accomplished by dog 78, adjustably fastened to drum 77, through lever 79, shaft 80, lever 81, connecting-rod 82, link 83, and clutch yoke 84, or may be manually operated through hand lever 85 which is an integral part of lever 79. Clutch 52 which controls the fast and slow feed is operated by dogs, 86, adjustably mounted on drum 77, through lever 87, shaft 88, lever 89, connecting-rod 90, link 91 and clutch yoke, 92, or may be manually operated by hand lever 93 which is an integral part of lever 87.

The cone gears of the positive speed change units are automatically or manually controlled to change spindle speed and tool speeds by hydraulic mechanism and as the one which operates the spindle, and the one which operates the feed, are identical in construction and operation, the former only will be described.

As has been before stated, the speed variation is accomplished by sliding the cones of each pair towards and from one another by means of levers 28 and 29. Movement of these levers is accomplished by pistons 94 and 95 (see Fig. 6). These are mounted at opposite ends of a common piston rod 96 and which at midlength has pinned to it a collar 97 with a ridial arm 98 (see Fig. 7) to which is attached connecting-rod 99 (see Fig. 2) pivoted at one end to lever 100, pivoted near its middle at 101. The other end of lever, 100, by means of knuckle block, 102, and toggles 103 and 104 is connected to and operates coneshifting arms 28 and 29. Collar 96, has another arm 105 (see Fig. 6) pinned to it and when the pistons move, operates slide valve 107 which controls ports 108 and 109 in cylinder block 110 of pistons 94 and 95 and which also coacts with ports in slide valve 111. Valve 111 is reciprocable by rotary cam 112, through pin 113, engaging the cam groove, on a rod 114, extending from valve 111, (Fig. 2).

Cam 112 is oscillated to shift the slide valve 111, by dog, 115, adjustably fastened to dog drum 77 and which, by means of cam face, 116, which coacts with pin 117 oscillates lever 118 in a direction parallel to the axis of the dog drum. Lever 118 is fastened to collar 119 by pivot screws 120, and collar 119 is fastened to one end of shaft 121, to the other end of which is fastened cam, 112, so that when lever 118 is oscillated in a direction parallel to the axis of the dog drum by dog 115, cam 112 is also oscillated and shifts valve 111.

Lever 118 may also be oscillated transversely to the axis of the dog drum by cam 122, which is part of dog, 115, to operate a valve of the hydraulic apparatus. It is normally held in the position shown in Fig. 2 by compression spring 123 acting on valve plunger 124 which pushes against pad 125 on lever 118 but which, as it is not fixed to the pad, allows lever 118 to be freely oscillated in the other path, at right angles.

When in the position shown in Fig. 2 valve plunger 124 closes drain valve 126, but when lever 118 is oscillated by cam 122, valve plunger 124 is pushed in against the pressure of spring 123, and thus opens drain valve 126. The functions of this drain valve will be hereinafter described.

The cylinders of pistons 94 and 95 in cylinder block 110 are supplied with fluid under pressure by pump 127 (Fig. 2) which is driven by shaft 34 through gears 128 and 129. The pump sucks fluid through pipe 130 from sump 131 and delivers it through pipes 132 to port 133 in cylinder block 110, the desired pressure being maintained by means of relief valve 134 in the pump delivery line. Fluid under pressure passes from port 133 to cylinder 135 of piston 94 through port 136 and to cylinder 137 of piston 95, through port 138 so that an equal pressure is normally exerted upon pistons 94 and 95, thus balancing them so that no movement may take place. Cylinder 135 may be connected with drain valve 126 through port 108, port 139 in slide valve 107, port 140 in slide valve 111, ports 141, 142 and 143 and pipes 144, and cylinder 137 may be connected with drain valve 126 through port 109, port 145 in slide valve 107, port 146 in slide valve 111, ports 147, 142 and 143, and pipes 144. These connections are normally closed by slide valves 111 and 107 as illustrated in Fig. 6, where the pistons 94 and 95 are also shown in their extreme left hand position.

Valve 111, may now be moved to the right by partial rotation of cam 112, and port 146 will be immediately uncovered and cylinder 137 connected with the drain valve 126. If drain valve 126 is closed, no movement will take place, but immediately that it is opened, a free passage will exist from cylinder 137 through to the drain and the pressure in cylinder 137 will drop. The excess of pressure in cylinder 135 will now cause the pistons to move to the right, carrying with them slide valve 107 and they will continue this movement until slide valve 107 closes port 146, when a condition of equilibrium will be again established, and motion will stop. In other words, when drain valve 126 is open, pistons 94 and 95 will be caused to move so that valve, 107, always follows valve 111. In the same way, the pistons may be moved toward the left, by a movement of valve 111 to the left uncovering port 140. It is, therefore, apparent that slide valve 111 may be placed in any desired position by means of cam 116 on dog 115 while valve 126 is closed, then valve 126 may be opened by cam 122 on dog 115 and pistons 94 and 95 will immediately move until valve 107 has closed the ports in valve 111. Or, if desired, drain valve 126 may be first opened by cam 122 before cam 116 positions valve 111. In this case, movement of the pistons will start immediately, when cam 116 starts to swing lever 118, and will continue until lever 118 comes to rest or until valve 126 is closed. From this I secure the following advantages: First, slide valve 111 may be set to its desired position and then by opening drain valve 126 a quick change from one speed to another will follow. This is desirable when turning tools are working on the shoulders of different diameters. Second, by first opening drain valve 126 and then slowly positioning valve 111, a slow, progressive change of speeds will follow. This is desirable when facing a piece of work. These speed changes may also be accomplished by hand through hand lever 147 which is an integral part of lever 118, and the feed changes are similarly accomplished by dogs 148 acting on lever 149, or manually by hand lever 150 which is an integral part of lever 149.

An important advantage of my double piston arrangement is that no piston rod packing is required; and I also require no packing for the slide valves.

What I claim is:—

1. A machine tool having cooperating work and tool holders, one being a rotating spindle, and the other a slide, a positive type variable speed connection between said rotating spindle and the slide, that includes adjustable means, to transmit motion at gradually changeable speeds between its minimum and maximum limits, a movable control member, operating means between such control member and said adjustable motion transmitting means, and an operating connection between said spindle and said control member.

2. A machine tool, as in claim 1, in which there is a drive shaft and a positive type variable speed connection between said shaft and the spindle, and operating means between such variable speed connection and the control member for changing speed of such connection.

3. A machine tool, having cooperating work and tool holders, means for rotating the work holder, means to impart relative motion of approach and withdrawal to said work and tool holders, comprising a speed changing unit with positive motion transmitting means, adjustable to transmit motion to said holder at gradually changeable speeds between its minimum and maximum limits, a rotatable control member, a driving connection between the work holder rotating means and said control member, and an operative connection between said control member and the adjustable element of said positive motion transmitting means.

4. A machine tool, as in claim 3, in which the positive motion transmitting means includes two sets of opposite cones, a shaft on which each set is mounted and on which opposing cones are shiftable toward and from one another, and a belt between the cones of the two sets, cone faces and belt edges having a positive cooperating driving surface, and having means to shift the cones of both sets simultaneously controlled by said control member.

5. A machine tool, comprising a revolving work spindle, and a reciprocating tool slide that have cooperative relation, a variable speed power transmitting unit having driving and driven members, that are adjustable for changing the speed ratio between said driving and driven members, a movable control element, an operative connection between said control element and said adjustable members, that includes means for pre-selecting a desired speed and for then changing the speed, and means for immediately changing the speed independently of the pre-selecting means, and a driving connection between the spindle and said control element.

6. A machine tool, comprising rotatable work and slidable tool holders, means to impart motion to at least one of such holders, comprising a speed changing unit adapted to transmit motion to said holder at gradually changeable speeds between minimum and maximum limits, said speed-changing means including oppositely situated, spaced apart driving and driven rotary elements, motion transmitting means interposed between such elements, in motion transmitting engagement, with both, slippage control means that control slippage between the engaging surfaces of said elements and said motion transmitting means, a movable control element, an operative connection between said element and said rotatable work holder, and an operative connection between said control element and said speed-changing unit.

7. A machine tool having cooperating work and tool holders, one being a rotating spindle, and the other a slide, a positive type variable speed connection between said rotating spindle and the slide that includes adjustable means to transmit motion at gradually changeable speeds between its minimum and maximum limits, a movable control member, operation means between such control member and said adjustable motion transmitting means, and an operative connection between said slide and said control member.

8. A machine tool having cooperating work and tool holders, one being a rotating spindle, and the other a slide, a positive type variable speed connection between said rotating spindle and the slide that includes adjustable means to transmit motion at gradually changeable speeds between its minimum and maximum limits, a movable member and said adjustable motion transmitting means, and operative connections between said control member and said slide and said spindle.

MYRON S. CURTIS.